US010182126B2

(12) United States Patent
Johnsimon et al.

(10) Patent No.: US 10,182,126 B2
(45) Date of Patent: Jan. 15, 2019

(54) MULTILEVEL REDIRECTION IN A VIRTUAL DESKTOP INFRASTRUCTURE ENVIRONMENT

(71) Applicant: Dell Products L.P., Round Rock, TX (US)

(72) Inventors: Jenin Johnsimon, Bangalore (IN); Anil Maryala, Bangalore (IN); Shinoj Sebastian, Bangalore (IN); Sanmati Tukol, Bangalore (IN); Mohammed Sarfraz, Bangalore (IN)

(73) Assignee: Dell Products L.P., Rock Round, TX (US)

( * ) Notice: Subject to any disclaimer, the term of this patent is extended or adjusted under 35 U.S.C. 154(b) by 237 days.

(21) Appl. No.: 15/144,228

(22) Filed: May 2, 2016

(65) Prior Publication Data
US 2017/0318112 A1   Nov. 2, 2017

(51) Int. Cl.
*G06F 15/173*   (2006.01)
*H04L 29/08*    (2006.01)
*G06F 9/00*     (2006.01)

(52) U.S. Cl.
CPC ............ *H04L 67/2814* (2013.01); *G06F 9/00* (2013.01); *H04L 67/04* (2013.01); *H04L 67/08* (2013.01); *H04L 67/2861* (2013.01)

(58) Field of Classification Search
CPC .. H04L 67/2814; H04L 64/4069; H04L 67/42
USPC ........................................................ 709/228
See application file for complete search history.

(56) References Cited

U.S. PATENT DOCUMENTS

| | | | |
|---|---|---|---|
| 2012/0096271 A1* | 4/2012 | Ramarathinam | ... H04L 63/0807 713/172 |
| 2015/0067035 A1* | 3/2015 | Sullad | ...... H04L 67/08 709/203 |

* cited by examiner

*Primary Examiner* — Sm A Rahman
(74) *Attorney, Agent, or Firm* — Kirton McConkie; Brian Tucker

(57) ABSTRACT

Multilevel redirection can be performed in a VDI environment. When a user establishes a second remote session within a first remote session, various redirection techniques can be configured to span both remote sessions so that redirection will be available within the second remote session in the same manner that redirection was available in the first remote session. Therefore, from the user perspective, redirection will occur regardless of whether the user has established a single tier remote session or multitier remote session.

19 Claims, 14 Drawing Sheets

MULTILEVEL REDIRECTION IN A VIRTUAL DESKTOP INFRASTRUCTURE ENVIRONMENT

CROSS-REFERENCE TO RELATED APPLICATIONS

N/A

BACKGROUND

The present invention is generally directed to redirection in a virtual desktop infrastructure (VDI) environment. In a VDI environment, a client establishes a remote session with a server. This remote session involves a desktop environment that is executed on the server with its display output being sent to the client where it is displayed to the user. The user can then provide input (e.g., keyboard and mouse input) at the client which is sent back to the server to be handled within the remote session. Accordingly, from the user perspective, it will appear as if the desktop environment is executed at the client rather than the server. For this reason, the desktop environment is referred to as a virtual desktop environment.

Because the desktop environment is executed on the server, various traditional computing techniques will not function in a proper manner without additional modifications. For example, if the user connects a USB device to the client terminal, the USB device will not be accessible within the remote session since the session exists on the server, not the client. Also, because the session is on the server which may be located in a different time zone than the client, the time zone of the server will be employed by applications (e.g., an email client) executed within the remote session rather than the time zone of the client. Further, because display output is transmitted to the client, if the remote session is used to render video, the rendered video will be transmitted to the client rather than the unrendered (i.e., compressed) video content thereby increasing the bandwidth required by the remote session.

To address these issues, redirection techniques have been developed. For example, USB redirection involves redirecting a USB device/interface connected to the client to the server for use within the remote session. Also, time zone redirection involves causing the remote session to employ a time zone of the client rather than a time zone of the server. Further, multimedia redirection involves sending unrendered multimedia content to the client for rendering rather than first rendering at the server and then sending the rendered content to the client. Similarly, URL redirection involves sending a URL for a streaming service to the client to allow the client to stream the content directly rather than having the content streamed to and rendered at the server.

Each of these redirection techniques increases the efficiency and usability of a remote session. However, they are only available when the remote session is established between the client and the server. If the user of the client establishes a remote session within a remote session, these redirection techniques will not be available in the newly established remote session. FIG. 1 illustrates why this is so using USB redirection as an example.

As shown in FIG. 1, client 101 establishes a remote session 110 with server 102. As part of establishing remote session 110, a proxy (not shown) on client 101 can redirect USB device 105 (which is connected to client 101) to an agent on server 102 which can cause the USB device to be accessible within remote session 110 (e.g., as virtual USB device 105a). As these USB redirection techniques are known in the art, no further detail will be provided as to how this redirection is accomplished.

However, if the user of client 101 establishes another remote session 111 with server 103 from within remote session 110, virtual USB device 105a will not be redirected to server 103. This is because the components employed on server 102 to establish remote session 111 will be executed within remote session 110 as if they were any other type of application and will therefore have no knowledge of the redirection of USB device 105.

However, from the user perspective, there will be little or no difference between working within remote session 110 or within remote session 111. Therefore, the fact that USB device 105 will not be available within remote session 111 can lead to substantial frustration and lack of productivity. This is especially true given the increasing number of scenarios where users are required to establish these types of multitier remote sessions. For example, if a user works from home, server 102 can represent a work server that allows connections from home while server 103 can represent a different server to which client 101 cannot directly connect and which provides a particular application necessary for the user to perform his work tasks. Some enterprise environments may even require this type of hop or multi-level channel when client 101 is located within the work environment (e.g., when client 101 is a thin or zero client or in BYOD environments). Also, some environments may employ a secure gateway which creates the same issue.

BRIEF SUMMARY

The present invention extends to methods, systems, and computer program products for performing multilevel redirection in a VDI environment. When a user establishes a second remote session within a first remote session, various redirection techniques can be configured to span both remote sessions so that redirection will be available within the second remote session in the same manner that redirection was available in the first remote session. Therefore, from the user perspective, redirection will occur regardless of whether the user has established a single tier remote session or multitier remote session.

In some embodiments, the present invention can be implemented by a multilevel redirector as a method for performing multilevel redirection. The multilevel redirector can receive redirection data over a first remote session that is established with the first server. The multilevel redirector can determine whether the redirection data should be routed to an agent on the first server or over a second remote session. Upon determining that the redirection data should be routed over the second remote session, the multilevel redirector can send the redirection data over the second remote session.

In another embodiment, the present invention can be implemented as computer storage media storing computer executable instructions which when executed in a VDI environment implement the following components: a proxy configured to execute on a client to establish remote sessions with a first server, the proxy being further configured to implement redirection over the remote sessions; an agent configured to execute on the first server to establish the remote sessions with the proxy and to establish remote sessions with an agent on a second server; and a multilevel redirector configured to execute on the first server, the multilevel redirector being configured to intercept redirection data received over remote sessions established either between the agent on the first server and the proxy or between the agent on the first server and the agent on the second server, the multilevel redirector being further configured to selectively route redirection data received over a first remote session to either the agent on the first server or over a second remote session.

In another embodiment, the present invention can be implemented by a multilevel redirector as a method for performing multilevel redirection. The multilevel redirector can receive first redirection data over a first remote session that is established between a client and the first server. The multilevel redirector can detect that a second remote session has been established between the first server and a second server within the first remote session. The multilevel redirector can then route the first redirection data over the second remote session to the second server.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, a client can refer to any type of computing device that is capable of establishing a remote session with a server. Similarly, a server can be any type of computing device or environment (such as a virtual machine) which is capable of establishing remote sessions. A remote session can be established using any available remoting protocol including, for example, Microsoft's Remote Desktop Protocol (RDP), Citrix's Independent Computing Architecture (ICA), VMWare's PC-over-IP (PCoIP), Dell's vWorkspace (EOP), etc. The term "redirection data" will be used to generally refer to any communication sent over a remote session that pertains to redirection. The term "nested remote session" will refer to a remote session that has been established within a remote session including within another nested remote session. In other words, the present invention can implement multilevel redirection over two or more remote sessions.

Figure 1:
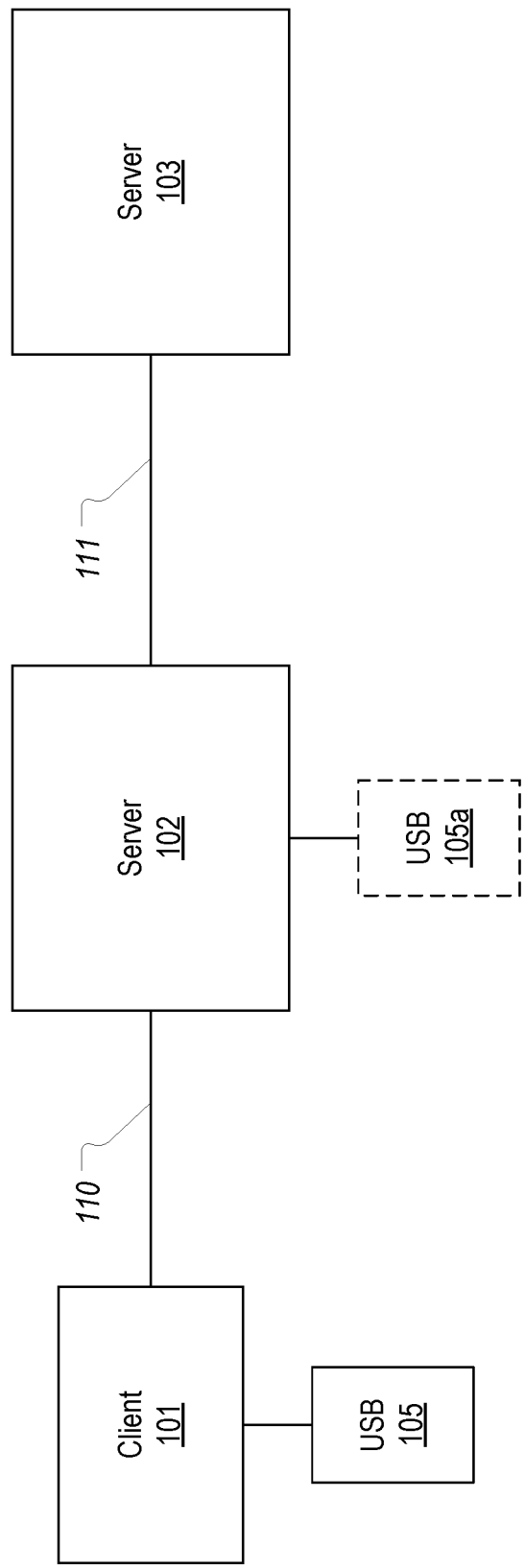
FIG. 1 illustrates an example computing environment in which the present invention can be implemented.
Figure 2:
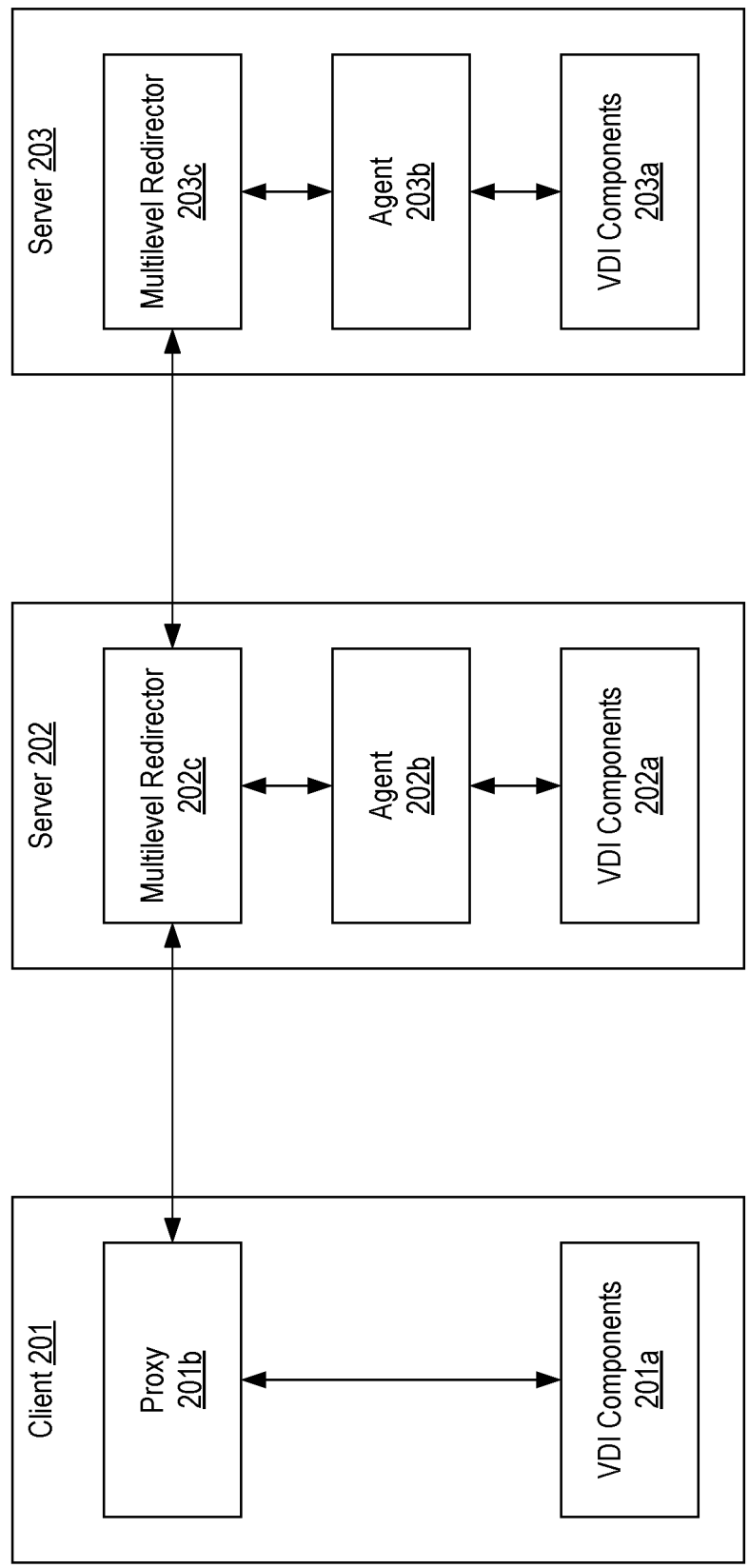
FIG. 2 illustrates various components that may be employed in a VDI environment to implement the present invention.

FIG. 2 illustrates various components that can be employed to implement embodiments of the present invention. Client 201 can establish a first remote session with server 202 and then a second remote session can be established with server 203 within the first remote session. Alternatively, client 201 could establish a first remote session with server 203 and then a second remote session could be established with server 202 within the first remote session. In other words, the components on servers 202 and 203 can be similarly configured to allow the "position" of the servers to be interchangeable.

As shown, each of client 201, server 202, and server 203 includes VDI components 201a, 202a, and 203a respectively. These VDI components can generally represent the various components that are tasked with establishing remote sessions and implementing the various redirection techniques including USB redirection, time zone redirection, multimedia redirection, and URL redirection. For purposes of this disclosure, multimedia redirection encompasses redirecting any type of multimedia content including Flash and HTML5 content. Specific examples of these VDI components will be provided in subsequent figures.

In addition to these VDI components, client 201 can include a proxy 201b, and servers 202 and 203 can include agents 202b and 203b respectively. Proxy 201b and agents 202b and 203b are configured to intercommunicate over a remote session to allow redirection to be implemented. Servers 202 and 203 can also include multilevel redirectors 202c and 203c respectively. Multilevel redirectors 202c and 203c are tasked with determining whether to bypass an intermediate server when redirection is being performed. For example, assuming client 201 has established a first remote session with server 202 and then established a second remote session with server 203 within the first remote session, multilevel redirector 202c can determine that any redirection should be implemented between client 201 and server 203 rather than between client 201 and server 202 or between server 203 and server 202 as will be further described below.

Figure 3A:
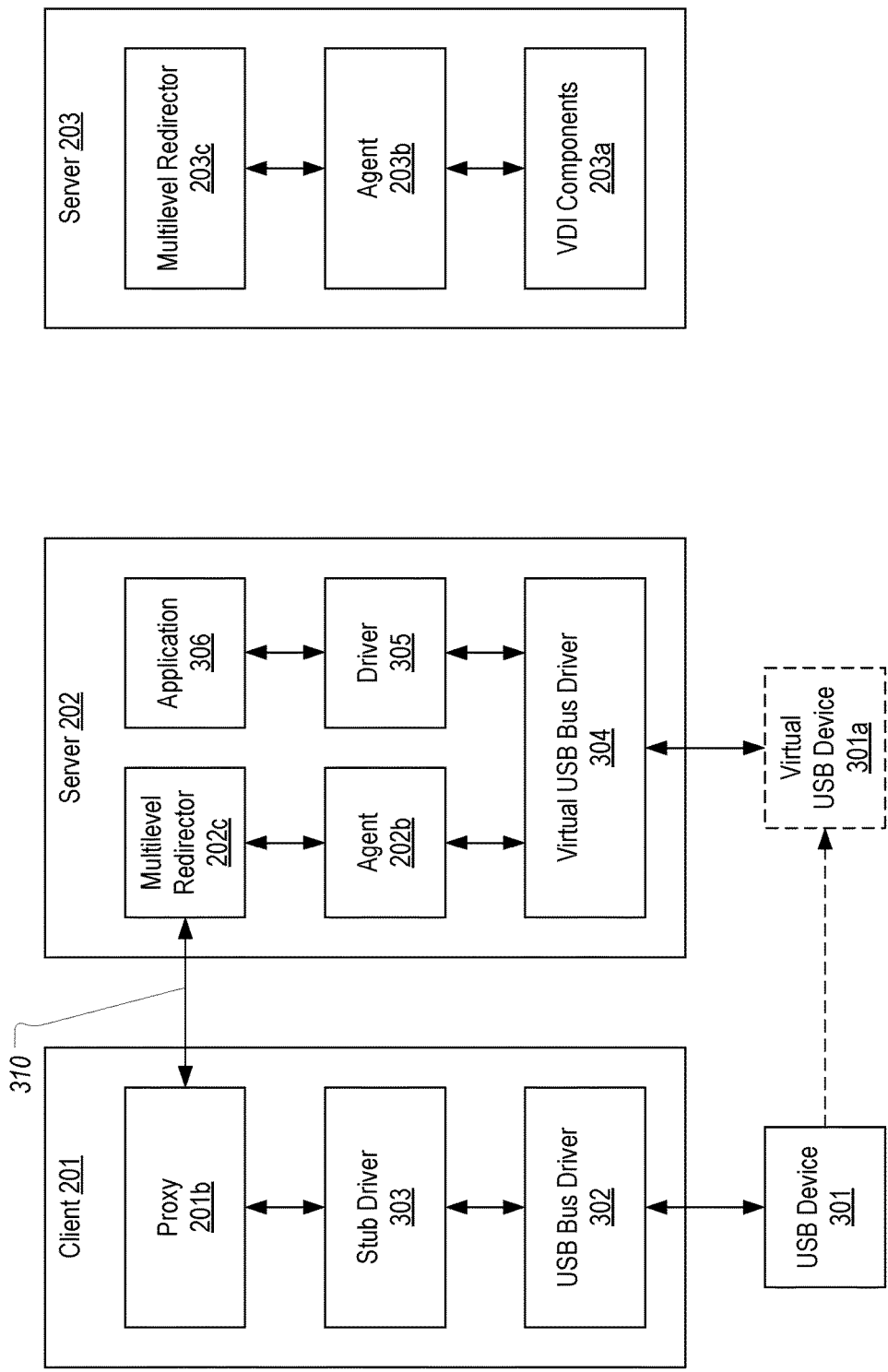
FIGS. 3A and 3B illustrate an example of how multilevel USB redirection can be implemented.
Figure 3B:
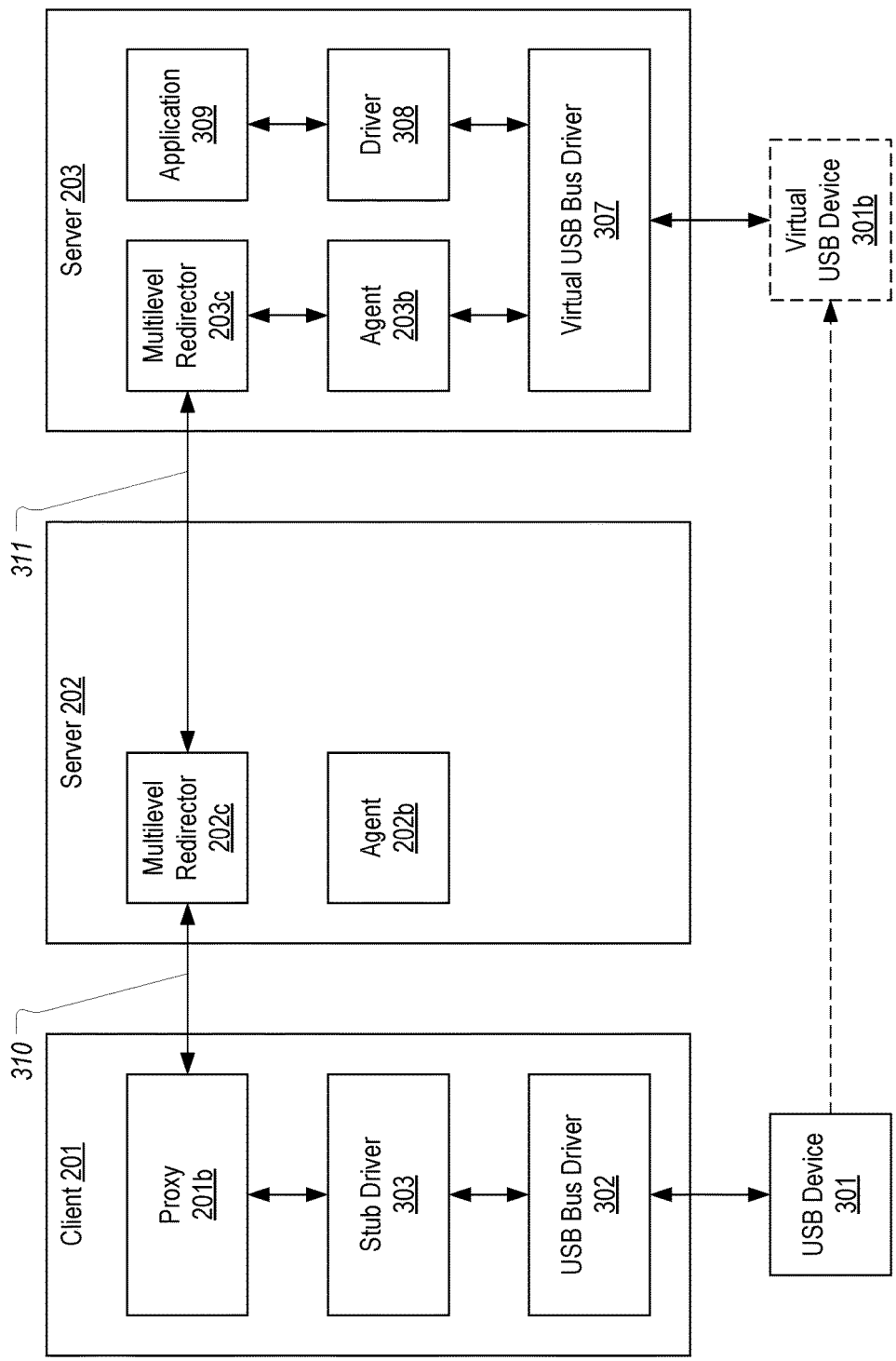

FIGS. 3A and 3B illustrate how multilevel USB redirection can be implemented. FIG. 3A illustrates typical single level USB redirection. As shown, a USB device 301 is connected to client 201 while client 201 has established a remote session 310 with server 202. It is assumed that client 201 is configured to implement USB redirection, and therefore, a USB bus driver 302 and a stub driver 303 are loaded on client 201 to interface with USB device 301. Unlike a typical driver, stub driver 303 is configured to route the USB communications to proxy 201b so that they can be sent over remote session 310 to agent 202b via multilevel redirector 202c. In this case, because no remote session has been established within remote session 310, multilevel redirector 202c can determine that USB device 301 should be redirected for use within remote session 310. Accordingly, multilevel redirector 202c routes the redirection data to agent 202b. Agent 202b can cause virtual USB bus driver 304 to be loaded (if not already loaded) which in turn can cause driver(s) 305 to be loaded to allow application 306 to access USB device 301 as virtual USB device 301a.

In contrast, FIG. 3B represents the scenario where a remote session 311 has been established within remote session 310, which multilevel redirector 202c can be configured to detect. Accordingly, multilevel redirector 202c can take appropriate action to cause USB device 301 to be redirected to server 203 rather than to server 202. This appropriate action can vary based on whether the USB device 301 is already being redirected to server 202 when remote session 311 is established. For example, if USB device 301 is coupled to client 201 after remote session 311 is established, multilevel redirector 202c can route the initial redirection communications received from proxy 201b to agent 203b via multilevel redirector 203c. In contrast, if USB device 301 is already being redirected to server 202 when remote session 311 is established, multilevel redirector 202c can send appropriate communications to cease the redirection to server 202 (e.g., by sending a notification to agent 202b that USB device 301 has been disconnected) and to commence the redirection to server 203 (e.g., by sending a notification to agent 203b that USB device 301 has been connected).

It is noted that multilevel redirector 203c can function in the same manner as multilevel redirector 202c. In particular, upon receiving redirection data over remote session 311, multilevel redirector 203c can determine whether an additional remote session has been established within remote session 311 to determine whether USB device 301 should be redirected to server 203 or to another server (i.e., a third server). This allows multilevel redirection to occur regardless of how many nested remote sessions are established. In the illustrated case, there is no remote session established within remote session 311, and therefore, multilevel redirector 203c routes the redirection data to agent 203b to cause virtual USB device 301b to appear on server 203 for use within remote session 311. Once remote session 311 is terminated, and assuming remote session 310 remains established, multilevel redirector 202c can take appropriate action to cause USB device 301 to be redirected to server 202 (e.g., by sending a notification to agent 202b that USB device 301 has been connected). Therefore, the multilevel redirector can constantly monitor the status of remote sessions and can selectively route redirection data accordingly.

Although not shown in these figures, once a virtual USB device is loaded on server 202 or server 203, applications on these servers can access USB device 301. Such attempts to access USB device 301 and any responses will generate redirection data that the multilevel redirector can also selectively route. For example, with reference to FIG. 3B, and assuming USB device 301 is a mass storage device, application 309 can send read requests via driver 308, virtual USB bus driver 307, agent 203b, and multilevel redirector 203c which will be received by multilevel redirector 202c. Multilevel redirector 202c can determine that these read requests should be routed to proxy 201b rather than to agent 202b so that they will reach USB device 301. Then, the read data can be returned over the same path with multilevel redirector 202c again determining that the read data should be routed back to agent 203b rather than to agent 202b. Accordingly, in the case of USB redirection, the multilevel redirector can continuously determine how to route redirection data to ensure that it reaches the appropriate destination.

To summarize, the multilevel redirector is configured as an intermediary between a client proxy and a server agent or between the agents on two servers. As an intermediary, the multilevel redirector will receive any redirection data and can determine how to route the redirection data based on whether a nested remote session has been established. It is noted, however, that the determination of whether to route redirection data over a nested remote session can also be based on user input and/or one or more configuration settings. For example, with reference to FIG. 3B, as part of establishing remote session 311, the user of client 201 may be prompted to specify whether multilevel redirection should be performed over remote session 311. If the user indicates that it should be, multilevel redirector 202c can route redirection data to agent 203b so that USB device 301 is redirected to server 203. However, if the user indicates that USB device 301 should not be redirected to server 203 (e.g., by specifying that USB device 301 should be redirected or remain redirected to server 202), multilevel redirector 202c can route redirection data to agent 202b.

Regarding configuration settings, and again with reference to FIG. 3B, multilevel redirector 202c may determine that USB device 301 should not be redirected to server 203, but should instead be redirected or remain redirected to server 202, based on an applicable policy (e.g., an Active Directory Group Policy that prevents a certain type of USB device from being redirected to server 203 or that prevents particular users from redirecting any USB device to server 203). The determination can also be based on the type of redirection (e.g., a policy may allow time zone redirection to server 203 but not USB redirection). In some cases, whether a user is presented with an option to perform multilevel redirection can be based on such policies. Accordingly, the multilevel redirector can analyze a number of factors when determining how to route redirection data pertaining to any type of redirection (e.g., USB redirection, time zone redirection, multimedia redirection, URL redirection, etc.).

Figure 4A:
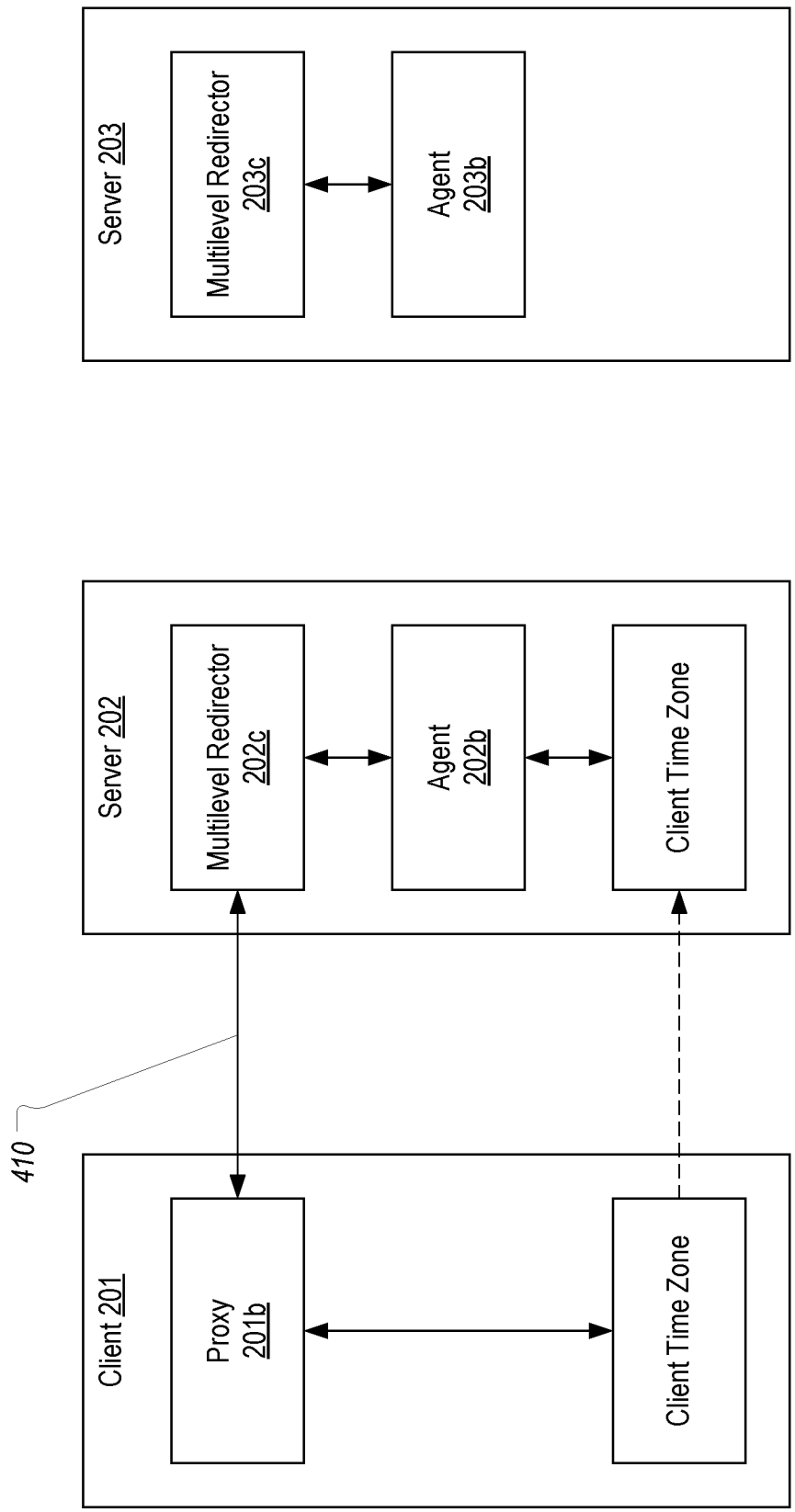
FIGS. 4A and 4B illustrate an example of how multilevel time zone redirection can be implemented.
Figure 4B:
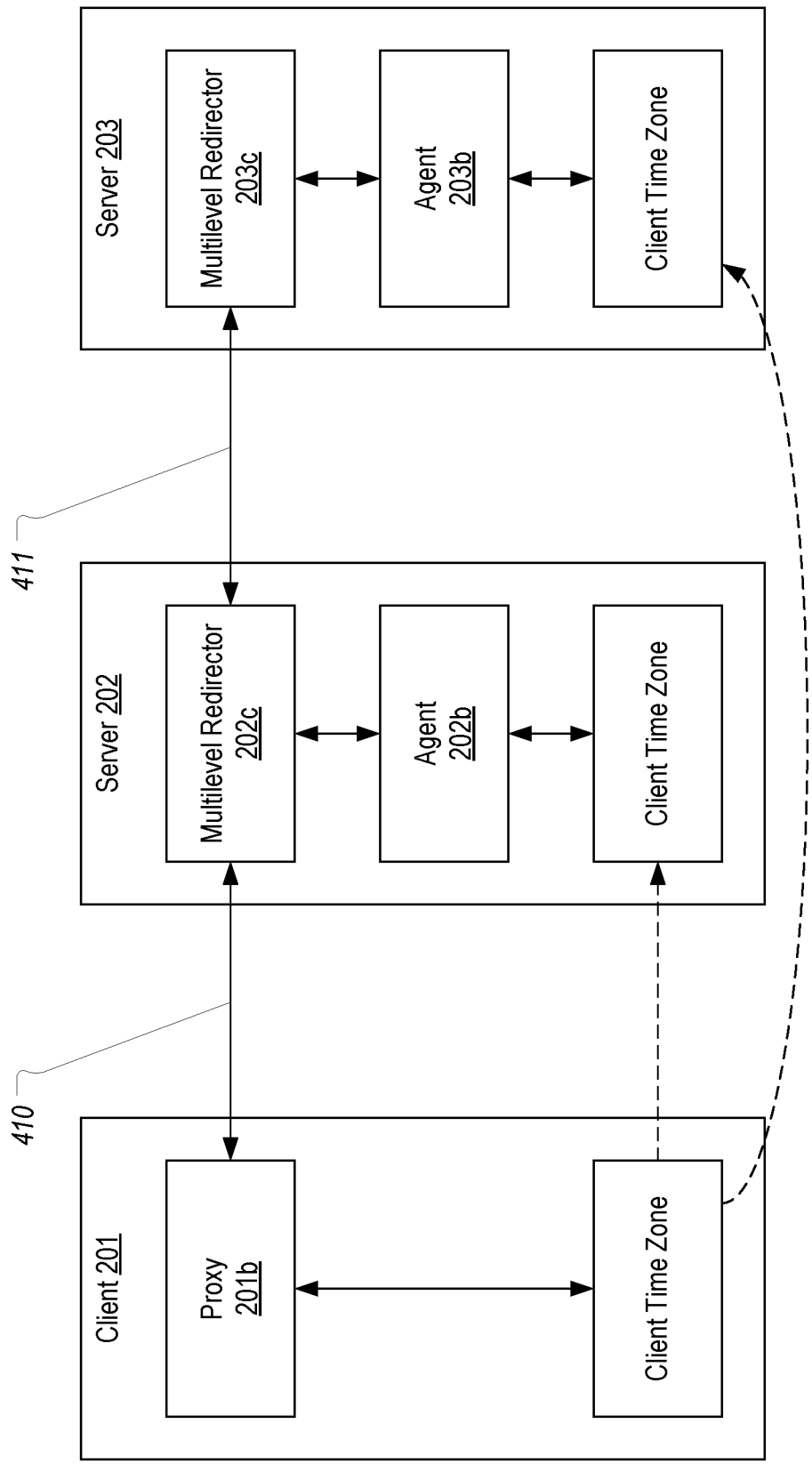

FIGS. 4A and 4B illustrates how time zone redirection can be implemented. Initially, it is noted that the multilevel redirector functions in substantially the same way regardless of which type of redirection is being implemented. In particular, the role of the multilevel redirector is to determine how to route the redirection data. FIG. 4A illustrates an example where client 201 has established a remote session 410 with server 202. It is assumed that client 201 is configured to implement time zone redirection and therefore, the selected time zone on client 201 (the "client time zone") is redirected over remote session 410 to server 202 so that remote session 410 can be configured to employ this same client time zone. Because there is no nested remote session (and assuming that any other applicable configuration settings would allow this redirection), multilevel redirector 202c will determine that this redirection data (i.e., the client time zone) should be routed to agent 202b which can then take necessary action to set the time zone employed by remote session 410 to the client time zone as is represented by the dashed arrow in FIG. 4A.

In contrast, FIG. 4B illustrates the case where remote session 411 has been established with server 203 within remote session 410. When remote session 411 is established, multilevel redirector 202c can determine that the client time zone should be redirected to server 203 so that remote session 411 employs the client time zone. It is noted that, under typical time zone redirection techniques, the time zone of server 202 (i.e., the time zone employed in the main server session) rather than the time zone of client 201 would be redirected to server 203 for use within remote session 411. This is because server 202 functions as the client when establishing remote session 411. However, due to its role as an intermediary, multilevel redirector 202c can ensure that the client time zone is routed to agent 203b rather than server 202's time zone.

It is also noted, in contrast to the redirection of a USB device which would typically only occur to a single server, time zone redirection can be performed simultaneously to each server within which the client has either directly or indirectly established a remote session. For example, as shown in FIG. 4B, multilevel redirector 202c has determined that the client time zone should be routed to both agents 202b and 203b so that the client time zone is used in both remote session 410 and remote session 411. This is another example of how the multilevel redirector can selectively route redirection data based on different factors.

Figure 5A:
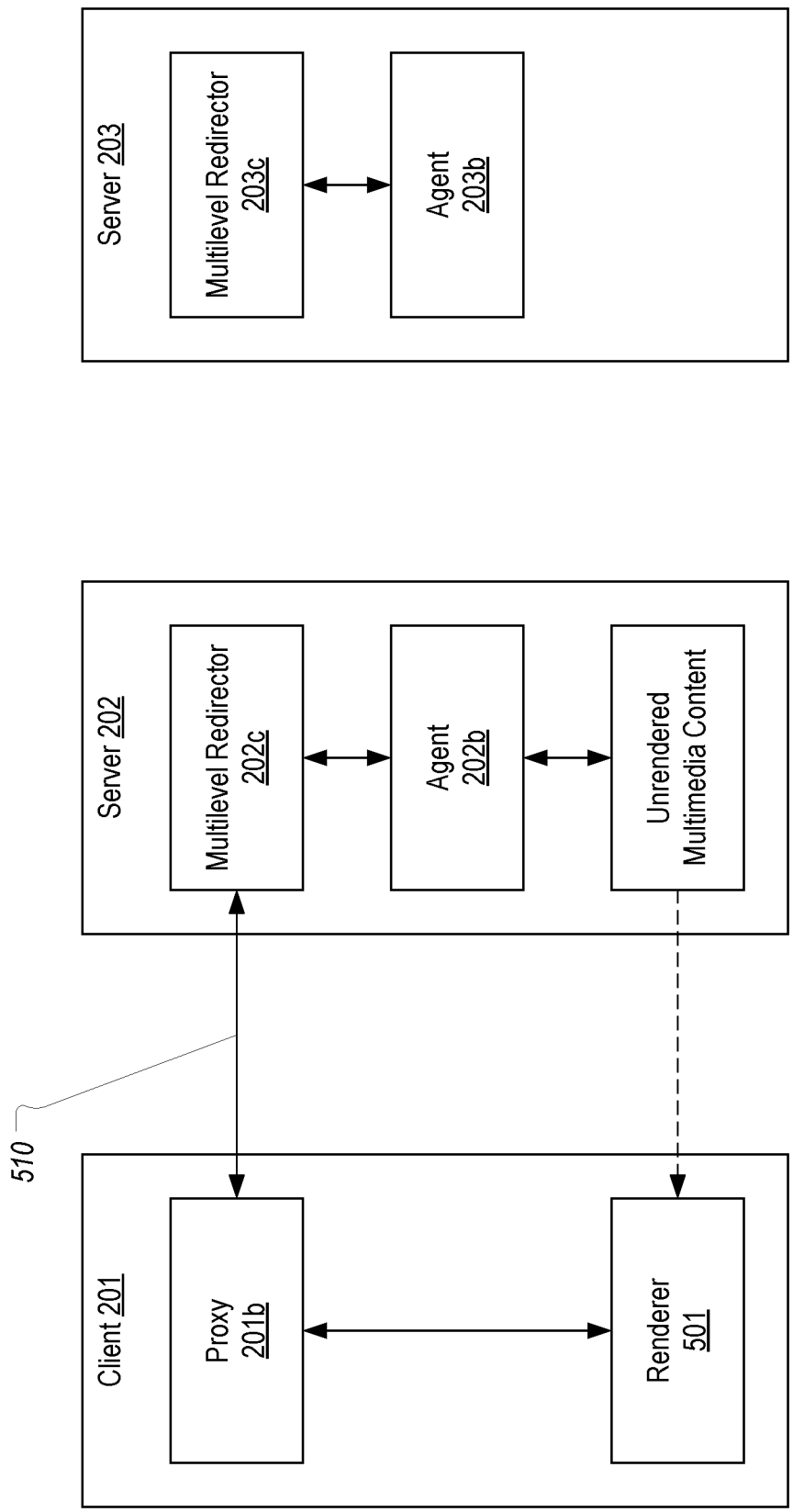
FIGS. 5A and 5B illustrate an example of how multilevel multimedia redirection can be implemented.
Figure 5B:
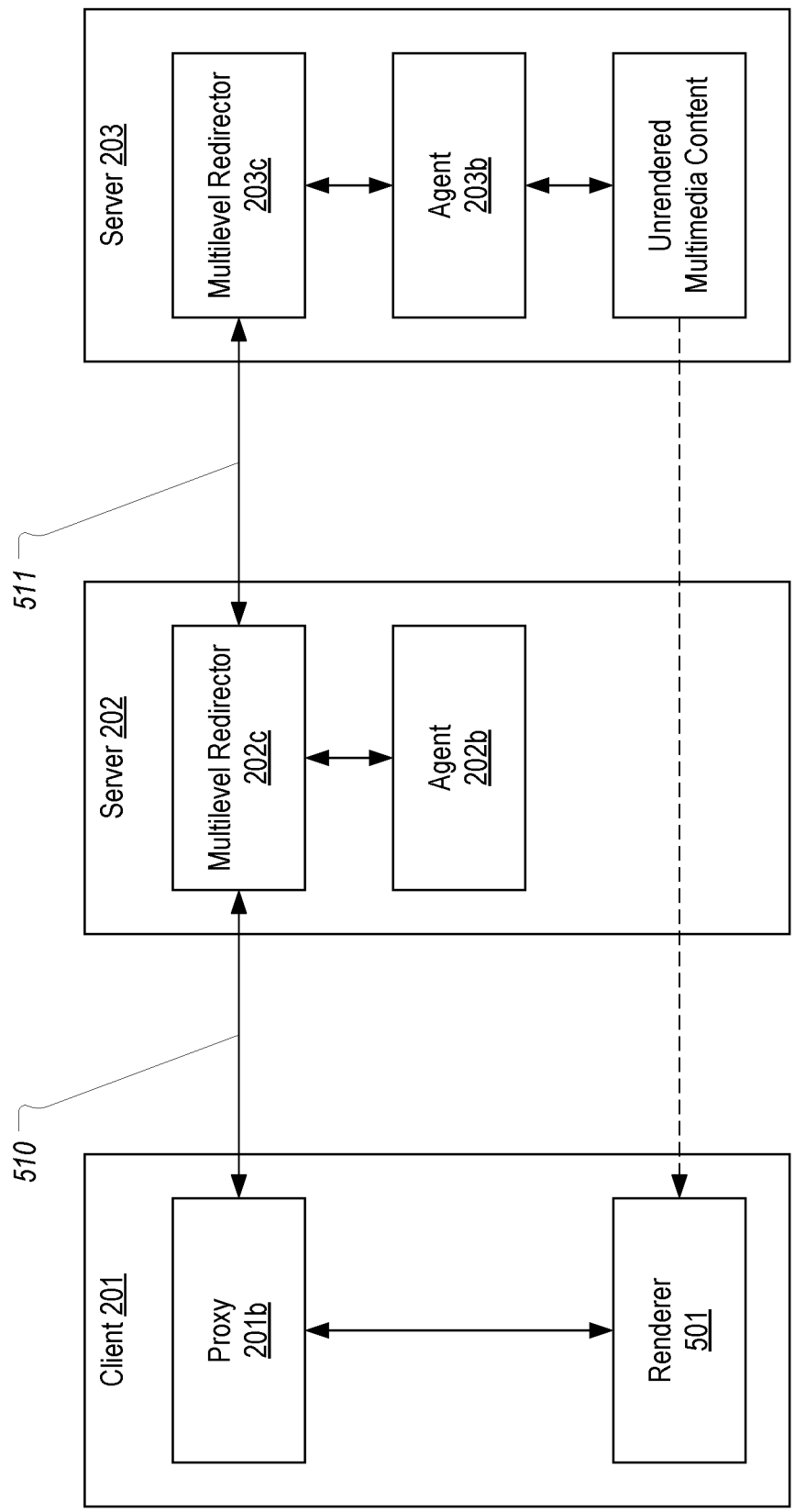

In the case of multimedia and URL redirection, the initial flow of redirection data is generally opposite of that in USB and time zone redirection. However, the multilevel redirector still functions as an intermediary to perform proper routing of the redirection data. FIGS. 5A and 5B illustrate how multilevel multimedia redirection can be accomplished. In FIG. 5A, client 201 has established a remote session 510 with server 202 and has requested that multimedia content be played within this remote session. In accordance with multimedia redirection techniques, the unrendered multimedia content can be sent to client 201 for rendering rather than being rendered on server 202. Accordingly, FIG. 5A illustrates that the unrendered multimedia content is routed by multilevel redirector 202c to proxy 201b which then routes the unrendered multimedia content to renderer 501 for rendering. This transfer of the unrendered multimedia content over remote session 510 is represented by the dashed arrow. In this example, multilevel redirector 202c can simply route the unrendered multimedia content over remote session 510.

In contrast, in FIG. 5B, a remote session 511 has been established within remote session 510. It will be assumed that the user of client 201 has requested that multimedia content be played within remote session 511 and that server 203 is configured to implement multimedia redirection. Accordingly, the unrendered multimedia content will be routed by agent 203b towards agent 202b. However, with multilevel redirector 202c acting as an intermediary, it can receive the unrendered multimedia content and determine that it should actually be routed to proxy 201b, not agent 202b. Therefore, multilevel redirector 202c can route the unrendered multimedia content over remote session 510 so that it will be received and played by renderer 501 on client 201 as represented by the dashed arrow.

The multilevel redirector can be configured to determine whether the remote session over which multimedia redirection data is received (e.g., remote session 511) is a nested remote session. If so, the multilevel redirector can route the multimedia redirection data over the remote session within which the nested remote session is established (e.g., over remote session 510). As described above, this determination can also be based on user input that specifies whether multilevel redirection should be performed. As with the other types of redirection, if there are multiple nested remote sessions, this rerouting of multimedia redirection data can be performed multiple times. For example, if there were a third server between client 201 and server 202 (such that remote session 510 was also a nested remote session), the multilevel redirector on this third server could similarly determine that the unrendered multimedia content should be routed to proxy 201b rather than to the agent on the third server.

Figure 6A:
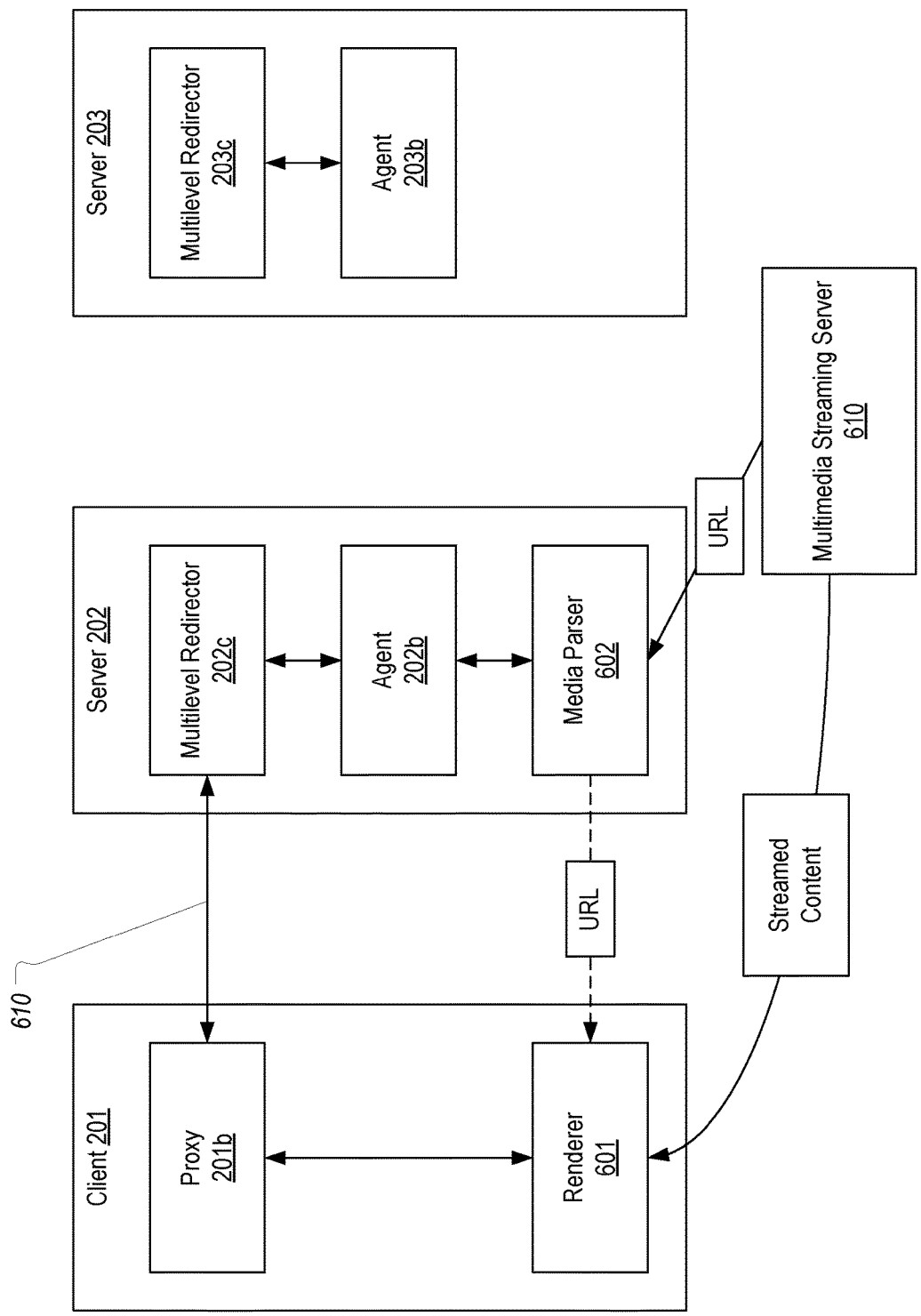
FIGS. 6A and 6B illustrate an example of how multilevel URL redirection can be implemented.
Figure 6B:
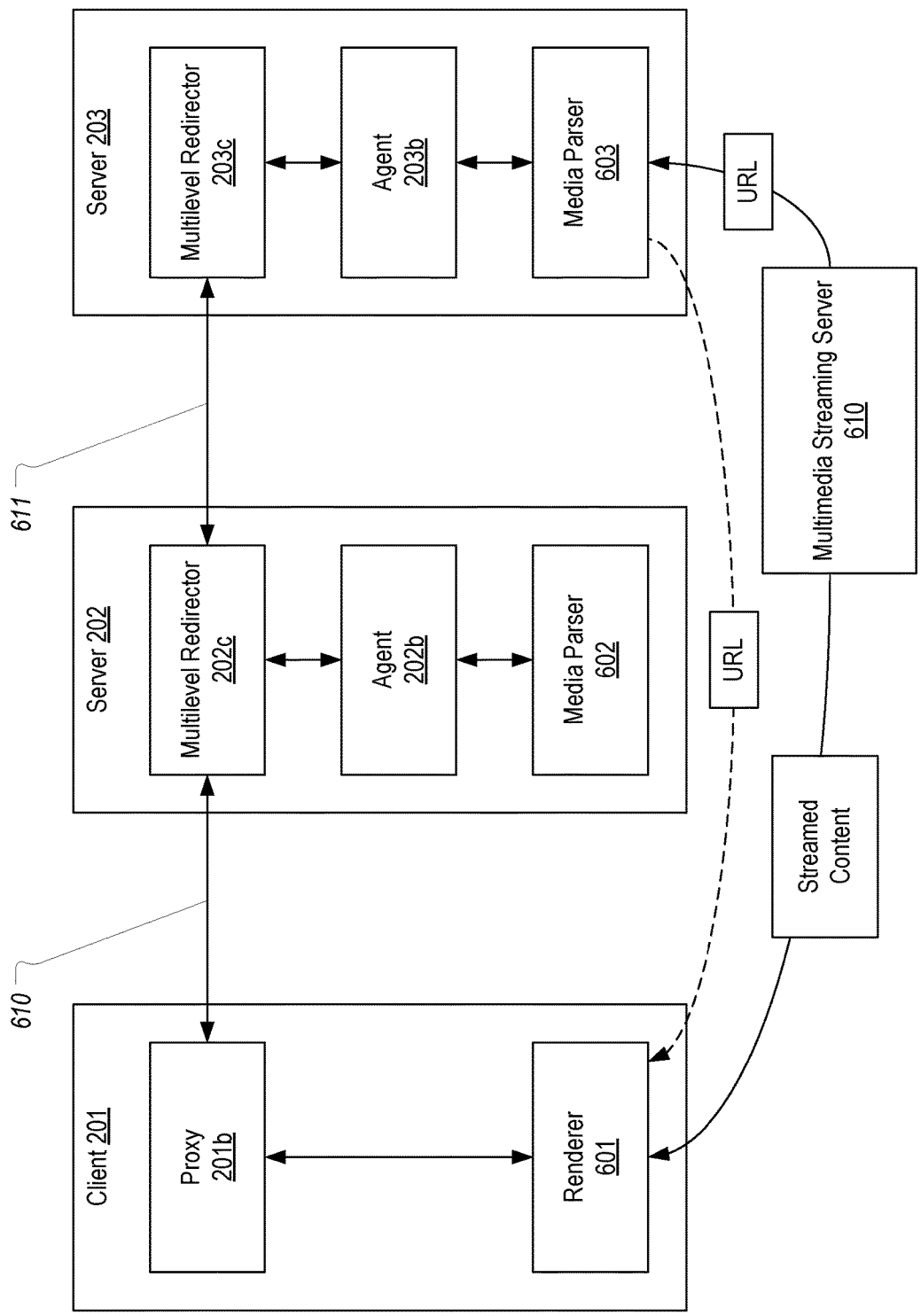

FIGS. 6A and 6B illustrate an example of how URL redirection can be implemented. URL redirection can be performed in substantially the same manner as multimedia redirection except that the redirection data includes a URL rather than unrendered multimedia content. As shown in FIG. 6A, a media parser 602 on server 202 obtains a streaming URL from a multimedia streaming server 610. Media parser 602 could do so in response to the user of client 201 providing input to remote session 610 requesting to stream content (e.g., by navigating to a streaming website).

In accordance with URL redirection techniques, media parser 602 can obtain the URL and send the URL to client 201 to allow the client to stream the content directly rather than streaming the content to the server for rendering. In this example, multilevel redirector 202c can simply route the URL over remote session 610 to proxy 201b which can then provide the URL to renderer 601 as represented by the dashed arrow. Renderer 601 can then use the URL to commence streaming the content from multimedia streaming server 610.

In contrast, FIG. 6B illustrates the case where a remote session 611 has been established within remote session 610 and the streaming of content has been requested within remote session 611. As described above, media parser 603 can obtain the streaming URL from multimedia server 610 and route the URL towards agent 202b. As an intermediary, multilevel redirector 202c can receive the URL and determine that remote session 611 is a nested remote session. Therefore, rather than routing the URL to agent 202b, multilevel redirector 202c can route the URL over remote session 610 to proxy 201b which can then route the URL to renderer 601. This transfer of the URL over remote sessions 611 and 610 is represented by the dashed arrow. Renderer 601 can then employ the URL to stream the content directly to client 201.

As mentioned above, this routing of the URL can be performed over more than two remote sessions if the client has established more than one nested remote session. In each case, when the multilevel redirector receives a URL over a remote session, it can determine whether the remote session is a nested remote session. If so, the multilevel redirector can route the URL over the next remote session rather than to the agent on the same server. To better illustrate this, it is noted that there may be cases where a "non-nested" remote session is established between server 202 and server 203 (e.g., when remote session 611 but not remote session 610 are established). In such cases, the URL (or other redirection data) should properly be routed to agent 202b rather than over another remote session. Accordingly, the multilevel redirector must be configured to evaluate the environment of the remote session used to transfer redirection data to properly determine how to further route the redirection data.

Figure 7A:
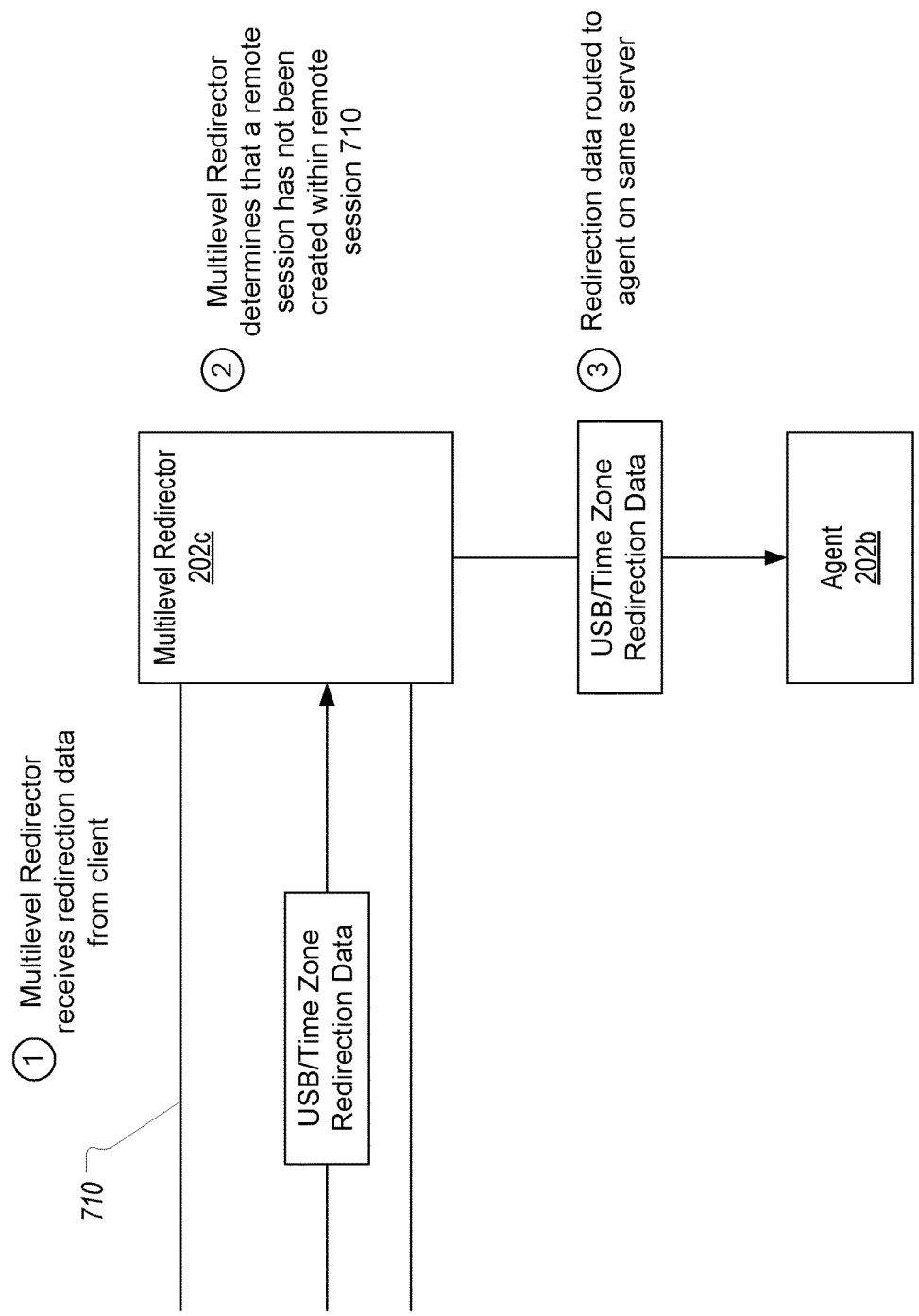
FIGS. 7A and 7B illustrate an example of how the multilevel redirector can determine how to route USB or time zone redirection data.
Figure 7B:
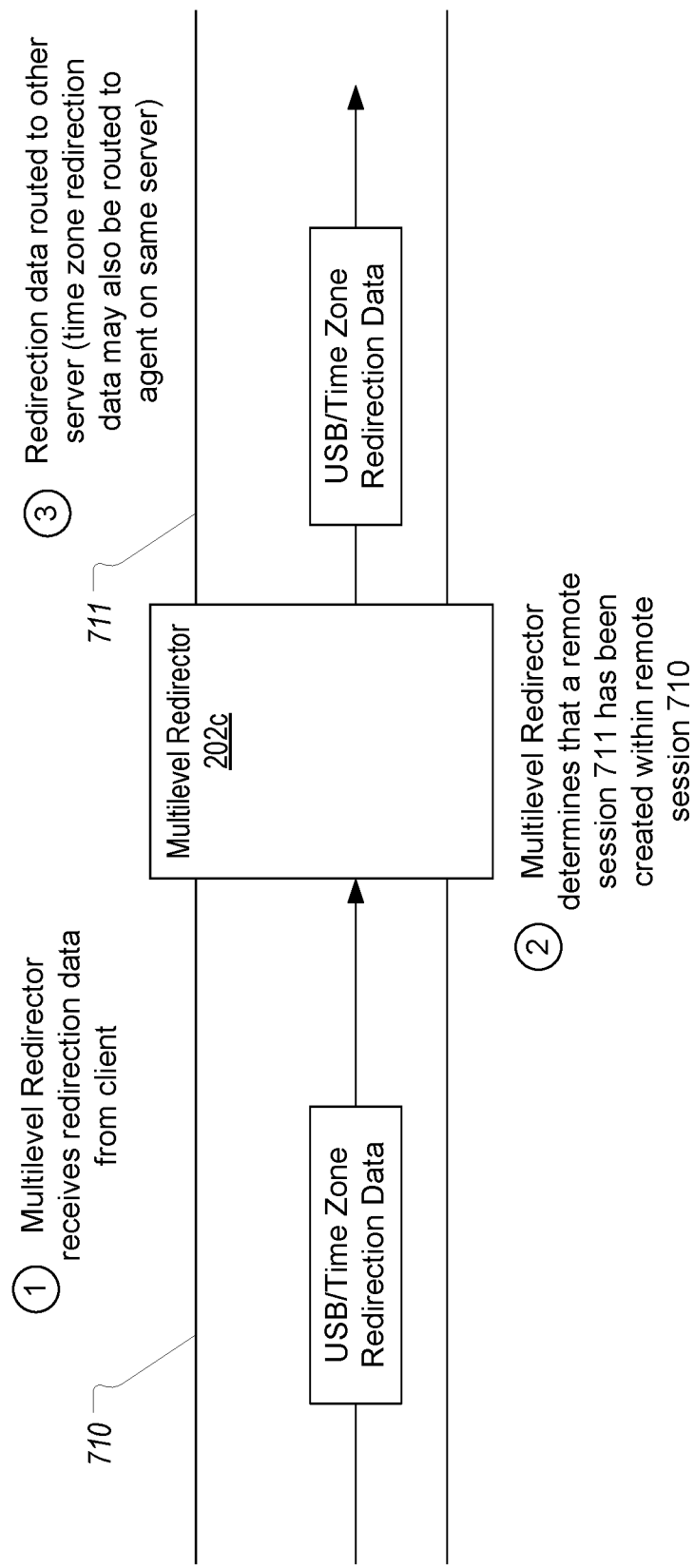

FIGS. 7A and 7B provide an additional example of how multilevel redirector 202c may make the determination of how to route USB or time zone redirection data. As shown in FIG. 7A, in a first step, USB or time zone redirection data is received over a remote session 710. In response, in a second step, multilevel redirector 202c can determine whether another remote session has been established within remote session 710. In this case, there is no nested remote session and therefore the redirection data should be routed to agent 202b on the same server. Therefore, in a third step, the redirection data is routed to agent 202b.

In contrast, FIG. 7B illustrates that a remote session 711 has been established within remote session 710. In the first step, multilevel redirector 202c again receives USB or time zone redirection data over remote session 710. Then, in a second step, multilevel redirector 202c determines whether there is a nested remote session. In this case, multilevel redirector 202c will determine that remote session 711 is a nested remote session within remote session 710. Although not shown, multilevel redirector 202c may also make a determination as to whether the redirection data should be routed over remote session 711 or should be directed to agent 202b based possibly on a number of factors as mentioned above. In this case, it will be assumed that any applicable configuration settings and/or user input specify that the redirection data should be routed over remote session 711. Therefore, in a third step, multilevel redirector 202c routes the redirection data over remote session 711 to the multimedia redirector executing on the server where remote session 711 has been established. The multimedia redirector on that server could perform a similar evaluation to determine how to further route the redirection data as described above.

Figure 8:
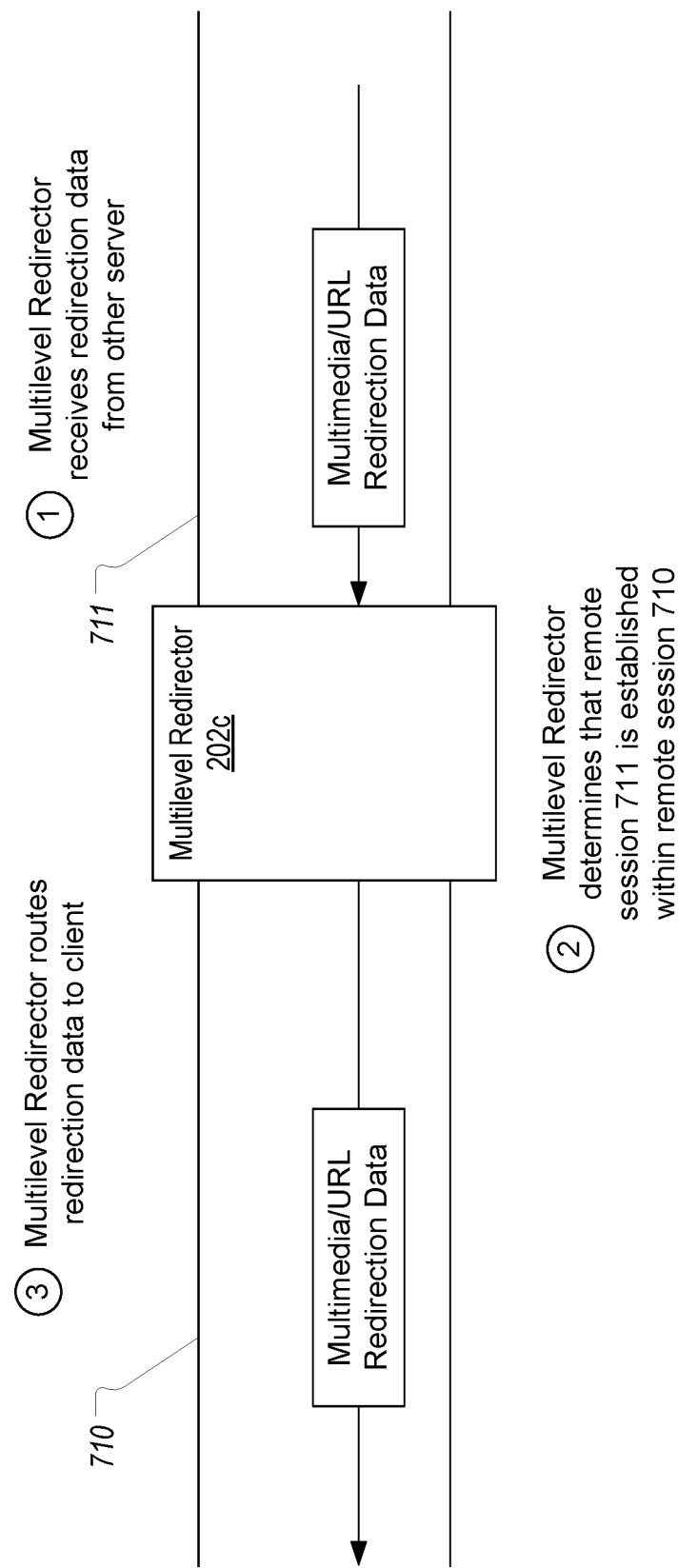
FIG. 8 illustrates an example of how the multilevel redirector can determine how to route multimedia or URL redirection data.

FIG. 8 illustrates an example of how multilevel redirector 202c can determine whether multimedia or URL redirection data that was received over a remote session should be routed over another remote session. In a first step, multilevel redirector 202c receives multimedia or URL redirection data over remote session 711. Then, in a second step, multilevel redirector 202c can determine whether remote session 711 is a nested remote session. In this case, multimedia redirector 202c will determine that remote session 711 is established within remote session 710. Therefore, in a third step, multilevel redirector 202c can route the redirection data over remote session 710 towards the client. Although not shown in the figures, if remote session 711 was not a nested remote session, multilevel redirector 202c could instead determine that the redirection data should remain on the same server and therefore route the redirection data to agent 202b.

The multilevel redirector can employ any suitable mechanism to determine whether a remote session has been created in a remote session over which redirection data has been received, or to determine whether a remote session over which redirection data has been received is a nested remote session. For example, because the multilevel redirector is an intermediary, it can detect whenever a remote session is established or terminated and can therefore maintain an appropriate record to facilitate the determination of how to route redirection data. As a specific example, when a nested remote session is created, the nested remote session will be associated with a session ID of the remote session within which the nested remote session is established. This multilevel redirector can employ this session ID to maintain a mapping between a remote session and its nested remote session. Redirection data transferred over a remote session will also be associated with a session ID. Therefore, the multilevel redirector can employ the associated session ID in conjunction with the mappings to determine how to route the redirection data.

With regards to multilevel USB redirection, in some embodiments of the invention, when a USB device is redirected to a server, session level restrictions can be applied to prevent the USB device from being accessed from within any unauthorized session. For example, with reference to FIG. 3B, once virtual USB device 301b is loaded at server 203, USB device 301 may become accessible to any application on server 203 including applications executing in any session (including local and remote sessions). However, in embodiments of the present invention, one or more policies may be applied at server 203 to limit which sessions will have access to the redirected USB device. For example, a group policy may define that only the user of client 201 (i.e., the user of the client which is redirecting the USB device) should have access to USB device 301. In such cases, the group policy can be applied to prevent USB device 301 from being accessed from within any session other than remote session 311. Similarly, a group policy may define that a group of users should not have access to a mass storage device. In such cases, if USB device 301 is a mass storage device, the group policy could be applied at server 203 to prevent USB device 301 from being accessed within a remote session associated with the group of users. Many other types of session level restrictions can also be applied to prevent unauthorized access to a USB device that has been redirected over multiple levels.

Figure 9:
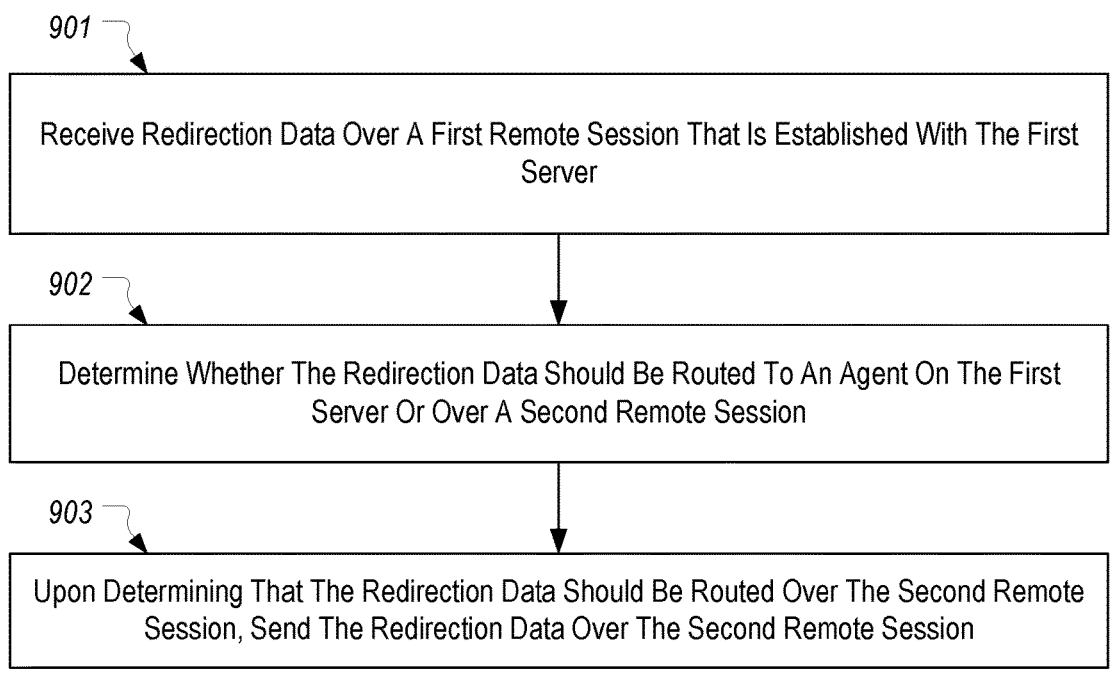
FIG. 9 illustrates a flowchart of an example method for performing multilevel redirection in a VDI environment.

FIG. 9 illustrates a flowchart of an example method 900 for performing multilevel redirection. As an example, method 900 can be performed by multilevel redirector 202c that executes on server 202 in a VDI environment.

Method 900 includes an act 901 of receiving redirection data over a first remote session that is established with the first server. For example, multilevel redirector 202c could receive redirection data over any of remote sessions 310, 311, 410, 411, 510, 511, 610, or 611.

Method 900 includes an act 902 of determining whether the redirection data should be routed to an agent on the first server or over a second remote session. For example, multilevel redirector 202c could determine whether to route the redirection data to agent 202b or over any of remote sessions 310, 311, 410, 411, 510, 511, 610, or 611 based on a number of different factors.

Method 900 includes an act 903 of, upon determining that the redirection data should be routed over the second remote session, sending the redirection data over the second remote session. For example, multilevel redirector 202c could route the redirection data over any of remote sessions 310, 311, 410, 411, 510, 511, 610, or 611.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a multilevel redirector that executes on a first server in a virtual desktop infrastructure (VDI) environment, for performing multilevel redirection, the method comprising:
   receiving redirection data from a client over a first remote session that is established between the client and the first server;
   determining whether the redirection data should be routed to an agent on the first server or over a second remote session that is established between the first server and a second server; and
   upon determining that the redirection data should be routed over the second remote session, sending the redirection data to the second server over the second remote session.

2. The method of claim 1, wherein the redirection data is one of USB redirection data or time zone redirection data.

3. The method of claim 1, wherein determining that the redirection data should be routed over the second remote session comprises determining that the second remote session has been established within the first remote session.

4. The method of claim 1, wherein determining whether the redirection data should be routed to the agent on the first server or over the second remote session comprises evaluating input from a user of the client identifying whether the redirection data should be routed to the second server.

5. The method of claim 4, wherein the input from the user is received in conjunction with establishing the second remote session.

6. The method of claim 1, wherein determining whether the redirection data should be routed to the agent on the first server or over the second remote session comprises evaluating one or more policies governing the routing of the redirection data.

7. The method of claim 1, further comprising:
   receiving additional redirection data from the second server over the second remote session;
   determining whether the additional redirection data should be routed to the agent on the first server or over the first remote session; and
   upon determining that the additional redirection data should be rooted over the first remote session, sending the additional redirection data to the client over the first remote session.

8. The method of claim 7, wherein the additional redirection data is one of multimedia redirection data or URL redirection data.

9. The method of claim 7, wherein determining whether the additional redirection data should be routed to the agent on the first server or over the first remote session comprises determining whether the second remote session was established within the first remote session.

10. The method of claim 1, further comprising:
    detecting that the second remote session has been terminated; and
    routing additional redirection data received over the first remote session to the agent on the first server.

11. One or more computer storage media storing computer executable instructions which when executed in a VDI environment implement the following components:
    a proxy configured to execute on a client to establish remote sessions with a first server, the proxy being further configured to implement redirection over the remote sessions;
    an agent configured to execute on the first server to establish the remote sessions with the proxy and to establish remote sessions with an agent on a second server; and
    a multilevel redirector configured to execute on the first server, the multilevel redirector being configured to intercept redirection data received over remote sessions established either between the agent on the first server and the proxy or between the agent on the first server and the agent on the second server, the multilevel redirector being further configured to selectively route redirection data received over a first remote session to either the agent on the first server or over a second remote session;
    wherein the first remote session is either established between the client and the first server, or established between the first server and the second server.

12. The computer storage media of claim 11, wherein the multilevel redirector is configured to route the redirection data received over the first remote session over a second remote session upon determining that the second remote session has been established.

13. The computer storage media of claim 12, wherein the first remote session is established between the client and the first server and the second remote session is established between the first server and the second server.

14. The computer storage media of claim 12, wherein the first remote session is established between the first server and the second server and the second remote session is established between the first server and the client.

15. The computer storage media of claim 12, wherein the redirection data received over the first remote session is USB redirection data, and wherein the multilevel redirector is configured to route the USB redirection data over the second remote session in response to user input received in conjunction with establishing the second remote session.

16. A method, performed by a multilevel redirector that executes on a first server in a virtual desktop infrastructure (VDI) environment, for performing multilevel redirection, the method comprising:
    receiving first redirection data over a first remote session that is established between a client and the first server;
    detecting that a second remote session has been established between the first server and a second server within the first remote session; and
    routing the first redirection data over the second remote session to the second server.

17. The method of claim 16, further comprising:
    receiving second redirection data over the second remote session; and
    routing the second redirection data over the first remote session to the client.

18. The method of claim 17, wherein the first redirection data is one of:
- USB redirection data pertaining to a USB device connected to the client such that the USB device is redirected over the first and second remote sessions to the second server; or
- time zone redirection data such that a time zone of the client is redirected to the second server for use within the second remote session.

19. The method of claim 17, wherein the second redirection data is one of: multimedia redirection data including unrendered multimedia content such that the unrendered multimedia content is redirected over the first and second remote sessions for rendering on the client; or
- URL redirection data including a streaming URL such that the streaming URL is redirected over the first and second remote sessions to allow the client to employ the streaming URL to stream content directly from a streaming server.

* * * * *